(12) United States Patent
Lu et al.

(10) Patent No.: US 11,803,168 B2
(45) Date of Patent: Oct. 31, 2023

(54) DISTRIBUTED CONTROL MODULES WITH CUMULATING COMMAND REFERENCES

(71) Applicant: General Electric Company, Schenectady, NY (US)

(72) Inventors: Manxue Lu, Swampscott, MA (US); Mitchell Donald Smith, Morrow, OH (US); Daniel Lee Immel, Covington, KY (US); Jon Tomas Zumberge, Centerville, OH (US)

(73) Assignee: General Electric Company, Schenectady, NY (US)

( * ) Notice: Subject to any disclaimer, the term of this patent is extended or adjusted under 35 U.S.C. 154(b) by 1272 days.

(21) Appl. No.: 16/296,471

(22) Filed: Mar. 8, 2019

(65) Prior Publication Data

US 2020/0285207 A1 Sep. 10, 2020

(51) Int. Cl.
- *F01D 17/20* (2006.01)
- *G05B 19/042* (2006.01)

(Continued)

(52) U.S. Cl.
CPC ............ *G05B 19/042* (2013.01); *B64C 19/00* (2013.01); *F01D 15/02* (2013.01); *F01D 17/20* (2013.01);

(Continued)

(58) Field of Classification Search
CPC .................. B64C 19/00; G05B 19/042; G05B 2219/25232; G05B 19/4148;

(Continued)

(56) References Cited

U.S. PATENT DOCUMENTS

| 4,245,298 A | 1/1981 | Slater |
| 4,719,397 A | 1/1988 | Kneifel, II et al. |

(Continued)

FOREIGN PATENT DOCUMENTS

| CN | 101211184 | 7/2008 |
| CN | 101911499 | 12/2010 |

(Continued)

OTHER PUBLICATIONS

Spooner et al., Stable Adaptive Control and Estimation for Nonlinear Systems, Neural and Fuzzy Approximator Techniques, John Wiley & Sons, Inc. Canada, 2002, 4 Pages.

(Continued)

*Primary Examiner* — Eldon T Brockman
*Assistant Examiner* — Andrew J Marien
(74) *Attorney, Agent, or Firm* — Fitch, Even, Tabin & Flannery LLP

(57) ABSTRACT

A distributed control system may include a main processing unit, a distributed control module, and a controllable component. The distributed control module may be configured to receive a nominal command reference from the main processing unit, determine a series of cumulating command references based at least in part on the nominal command reference; and output a series of cumulating control commands to the controllable component. The series of cumulating control commands may be based at least in part on the series of cumulating command references.

19 Claims, 11 Drawing Sheets

(51) Int. Cl.
*B64C 19/00* (2006.01)
*F01D 15/02* (2006.01)
*G05B 19/414* (2006.01)
*G05B 19/418* (2006.01)

(52) U.S. Cl.
CPC ..... *G05B 19/0421* (2013.01); *G05B 19/4148* (2013.01); *G05B 19/41845* (2013.01); *G05B 2219/25232* (2013.01); *G05B 2219/25472* (2013.01); *G05B 2219/33273* (2013.01)

(58) Field of Classification Search
CPC ...... G05B 19/0421; G05B 2219/25472; G05B 19/41845; G05B 2219/33273; F01D 15/02; F01D 17/20
See application file for complete search history.

(56) References Cited

U.S. PATENT DOCUMENTS

| | | | |
|---|---|---|---|
| 4,925,312 A | 5/1990 | Onaga et al. | |
| 5,486,997 A | 1/1996 | Reismiller et al. | |
| 6,330,483 B1 | 12/2001 | Dailey | |
| 6,757,583 B2 | 6/2004 | Giamona et al. | |
| 7,629,764 B2 | 12/2009 | Shoemaker et al. | |
| 7,719,446 B2 * | 5/2010 | Rosenthal | H03H 17/0642 |
| | | | 708/313 |
| 7,826,952 B2 | 11/2010 | Disser et al. | |
| 9,201,418 B1 | 12/2015 | Chiu et al. | |
| 9,405,277 B2 | 8/2016 | Cameron | |
| 2009/0150705 A1 | 6/2009 | Gmeiner | |
| 2012/0078446 A1 * | 3/2012 | Cameron | G05B 6/02 |
| | | | 701/3 |
| 2013/0090745 A1 * | 4/2013 | Frazer | G05B 19/054 |
| | | | 700/12 |
| 2016/0147433 A1 | 5/2016 | Lin et al. | |

FOREIGN PATENT DOCUMENTS

| | | |
|---|---|---|
| CN | 102330608 | 1/2012 |
| CN | 102437834 | 5/2012 |
| CN | 104483926 | 4/2015 |
| CN | 107924163 | 4/2018 |
| EP | 2434356 | 3/2012 |
| EP | 2434356 A2 | 3/2012 |

OTHER PUBLICATIONS

Hencey et al., Distributed Model Predictive Control for More Electric Aircraft Subsystems Operating at Multiple Time Scales, IEEE Transactions on Control Systems Technology, 11 Pages.
Barcelli et al, Hierarchical Multi-Rate Control Design for Constrained Linear Systems, 49th IEEE Conference on Decision and Control, Atlanta, GA, Dec. 15-17, 2010, pp. 5216-5221.
Brdys et al., Hierarchical Predictive Control of Integrated Wastewater Treatment Systems, Control Engineering Practice, ScienceDirect, vol. 16, 2008, pp. 751-767.
European Search Report Corresponding to Application No. 20161003 dated Jul. 28, 2020.

\* cited by examiner

DISTRIBUTED CONTROL MODULES WITH CUMULATING COMMAND REFERENCES

FIELD

The present disclosure generally pertains to distributed control systems, and more particularly to distributed control systems that include distributed control modules configured to provide cumulating command references and corresponding cumulating control commands.

BACKGROUND

Distributed control systems generally provide increased reliability by localizing control commands to various distributed control modules associated with corresponding controllable components. A distributed control system may include a main processing unit that sends nominal command references to various distributed control modules. In some implementations, a distributed control module may have a faster clock than that of a main processing unit. Differences in unit time intervals between a main processing unit and a distributed control module may introduce noise into a control loop. Such noise may be introduced, for example, when a distributed control module attempts to output control commands at a faster unit time interval than the unit time interval at which nominal command references are provided by the main processing unit. While the distributed control module could be slowed to reduce noise, this may reduce the responsiveness of a control loop implemented by the distributed control module to control the controllable component.

Accordingly, there exists a need for improved distributed control systems, including distributed control systems with distributed control modules that have improved capabilities to operate at unit time intervals that are faster than that of a main processing unit.

BRIEF DESCRIPTION

Aspects and advantages will be set forth in part in the following description, or may be obvious from the description, or may be learned through practicing the presently disclosed subject matter.

In one aspect, the present disclosure embraces methods of controlling a controllable component. An exemplary method may include receiving a nominal command reference from a main processing unit, determining a series of cumulating command references based at least in part on the nominal command reference, and outputting a series of cumulating control commands to a controllable component. The series of cumulating control commands may be based at least in part on the series of cumulating command references.

In another aspect, the present disclosure embraces distributed control systems. An exemplary distributed control system may include a main processing unit, a distributed control module, and a controllable component. The distributed control module may be configured to receive a nominal command reference from the main processing unit, determine a series of cumulating command references based at least in part on the nominal command reference; and output a series of cumulating control commands to the controllable component. The series of cumulating control commands may be based at least in part on the series of cumulating command references.

In yet another aspect, the present disclosure embraces computer readable medium. Exemplary computer readable medium may include computer-executable instructions, which, when executed by one or more processors of a distributed control module, cause the distributed control module to: receive a nominal command reference from the main processing unit; determine a series of cumulating command references based at least in part on the nominal command reference; and output a series of cumulating control commands to the controllable component. The series of cumulating control commands may be based at least in part on the series of cumulating command references.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
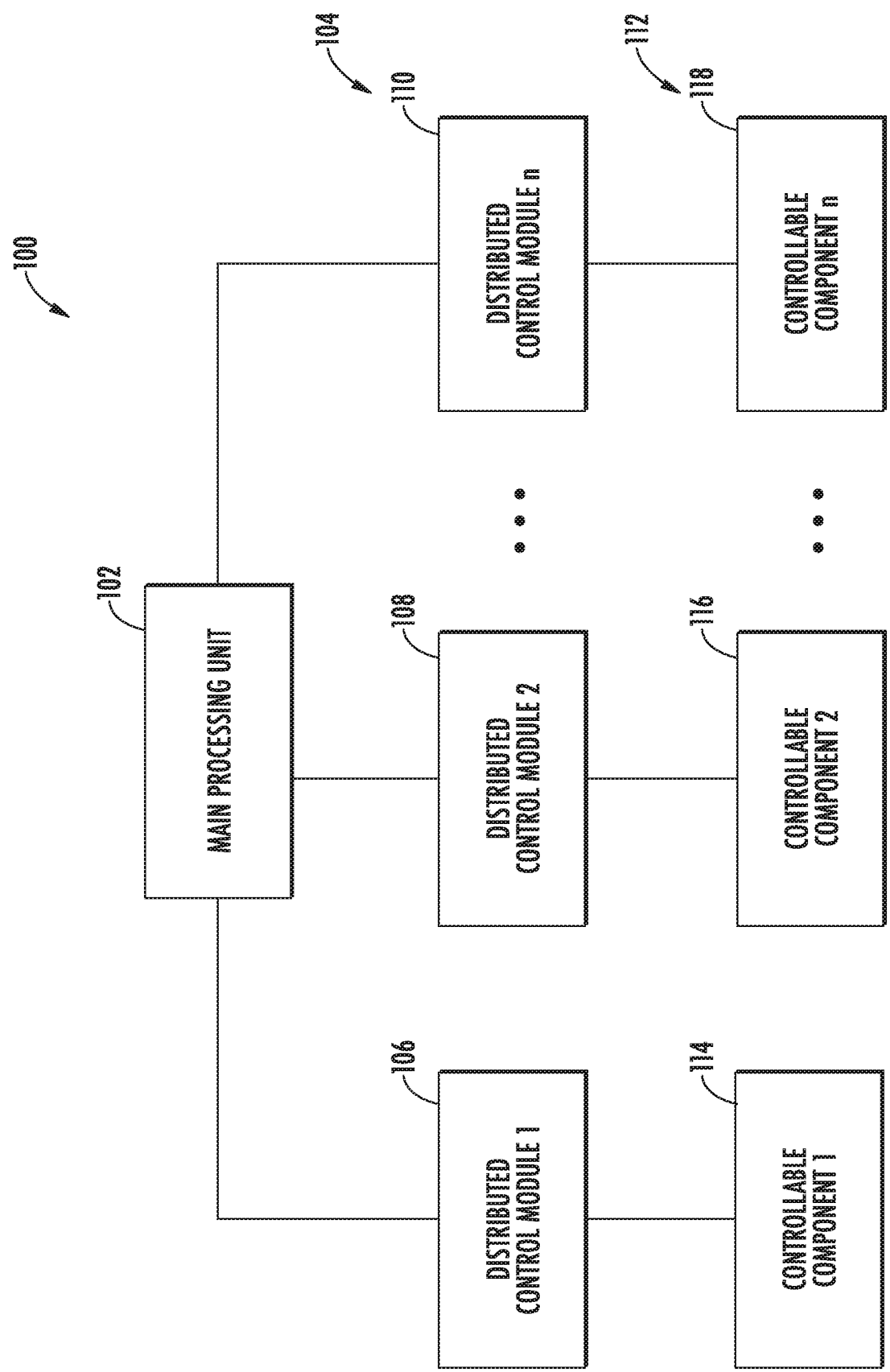
FIG. 1 shows a block diagram depicting an exemplary distributed control system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides distributed control systems and distributed control modules that are configured to control controllable components according to a series of control commands that are based on a series of cumulating command references. A distributed control module may provide a series of cumulating command references by upsampling a nominal command reference from a main processing unit. In exemplary embodiments, the distributed control module (DCM) may have a faster DCM unit time interval (t) than that of the main processing unit (MPU), allowing the distributed control module to provide control commands at a faster unit time interval than the MPU unit time interval (u) associated with nominal command references from the main processing unit. The presently disclosed cumulating command references may reduce noise in a control loop, for example, by providing a series cumulating control commands that distribute a nominal command reference from the main processing unit across a DCM unit time interval (t). The cumulating control commands may be provided based on a series of cumulating command references, which may be generated by a command reference generation module or other aspect of a distributed control module.

While a DCM may be configured to operate with a DCM unit time interval (t) that is faster than an MPU unit time interval (u), in general, the nominal command references from the main processing units may preferably be distributed across the DCM unit time interval (t) rater than applying the nominal command references in a single step-change because such a step-change may introduce an undesired transient response. Such transient response may be attributable to the faster unit time interval of the DCM versus the MPU, and the magnitude of the transient response may be proportionate to such difference in DCM and MPU unit time intervals. The nominal command references from the MPU may be distributed across the DCM unit time interval (t) evenly or substantially evenly (e.g., according to the nearest integer or non-integer value).

Exemplary embodiments may be configured to automatically handle both synchronous and asynchronous time domains. When the DCM and the MPU have synchronous time domains, the nominal command references may be distributed evenly according to the nearest integer value. When the DCM and the MPU have asynchronous time domains, the nominal command references may be distributed substantially evenly according to the nearest integer value.

Distributed control modules may be configured according to the present disclosure so as to allow for "plug and play" installation of the distributed control module into a distributed control system. This includes distributed control modules configured to self-configure for providing cumulating command references and corresponding cumulating control commands. Exemplary distributed control modules may be configured to compatibly provide cumulating command references and corresponding cumulating control commands using nominal command references provided at any MPU unit time interval (u). This includes distributed control system configurations in which a DCM unit time interval (t) and an MPU unit time interval (u) have synchronous time domains, as well as configurations in which a DCM unit time interval (t) and an MPU unit time interval (u) have asynchronous time domains.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Exemplary embodiments of the present disclosure will now be described in further detail. FIG. 1 shows an exemplary distributed control system 100. The distributed control system 100 may include a control system for a turbomachine or any other engine, machine, process, or plant, and may include a large number of distributed control modules distributed throughout the distributed control system 100. By way of example, a distributed control system 100 may include or be incorporated into a full authority direct engine control (FADEC) system or an engine control unit (ECU) for a turbomachine and/or an aircraft.

As shown, an exemplary distributed control system 100 may include a main processing unit 102, one or more distributed control modules 104, and one or more controllable components 112 respectively associated with corresponding distributed control modules 104. The distributed control system 100 distributes control processing among the distributed control modules 104. Typically, the main processing unit 102 provides centralized, supervisory control for the distributed control modules 104, and the respective distributed control modules 104 implement one or more control loops for controlling one or more controllable components 112 associated with the corresponding distributed control module 104 according to the supervisory control from the main processing unit 102. A main processing unit 102 may include a data warehouse and a server configured to transmit data from the data warehouse to distributed control modules 104 and/or to receive data from the distributed control modules 104 and to store the received data in the data warehouse for further purposes.

Operations and methods associated with a distributed control system 100, including operations and methods associated with a distributed control module 104, may be implemented within the context of a turbomachine 800 (FIG. 8), such as a turbomachine 800 installed on an aircraft. The operations and methods described herein may be carried out, for example, during flight, as well as during pre-flight and/or post-flight procedures.

Any number of distributed control modules 104 may be provided. By way of example, the exemplary distributed control system 100 shown in FIG. 1 includes a first distributed control module 106, a second distributed control module 108, and an Nth distributed control module 110. A distributed control module 104 may be associated with one or more controllable components 112. By way of example, the exemplary distributed control system 100 shown in FIG. 1 includes a first controllable component 114 associated with the first distributed control module 106, a second controllable component 116 associated with the second distributed control module 108, and an Nth controllable component 118 associated with the Nth distributed control module 110. However, it will be appreciated that a plurality of controllable components 112 may be associated with an individual distributed control module 104, and/or that an individual controllable component 112 may be associated with a plurality of distributed control modules 104.

By way of example, a controllable component 112 may include an actuator or a servo-actuator, and a sensor may include a position sensor configured to measure a position of the actuator or servo-actuator. As another example, a controllable component 112 may include a variable-geometry component, or an actuator or servo-actuator coupled to a variable-geometry component. Exemplary variable-geometry components include fuel valves, variable-position fan blades, variable-position guide vanes, variable-position compressor blades, and variable-position turbine blades.

Figure 2:
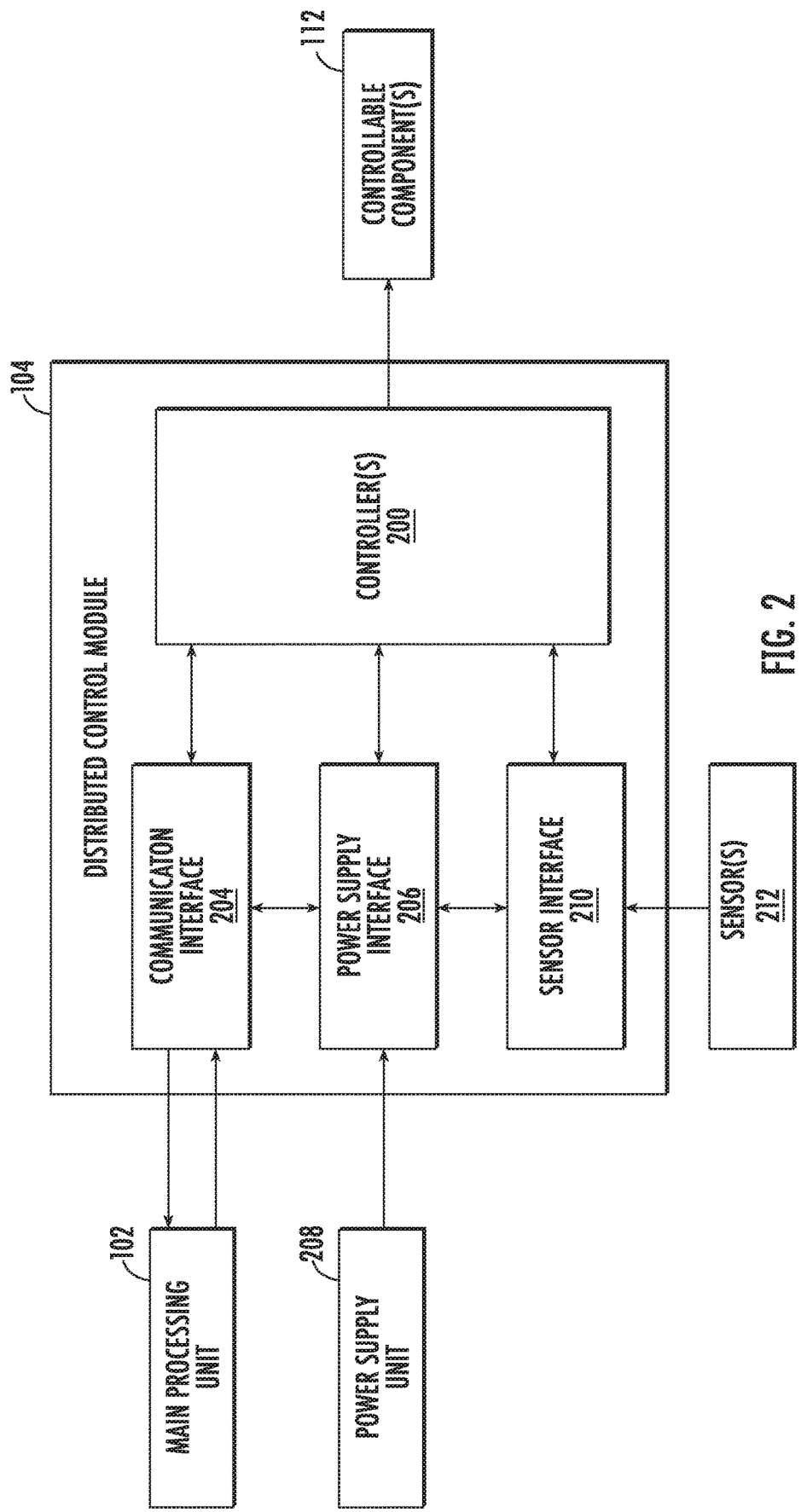
FIG. 2 shows a block diagram depicting an exemplary distributed control module that may be included in a distributed control system.

An exemplary distributed control module 104 is shown in FIG. 2. As shown, a distributed control module 104 may include one or more controllers 200 communicatively coupled to a main processing unit 102 and one or more controllable components 112. The controller may be configured to control the one or more controllable components 112 by implementing a control loop or combination of control loops under supervisory control from the main processing unit 102. Exemplary control loops that may be implemented by the controller 200 include open-loop control, closed-loop control, as well as a combination thereof.

As used herein, the terms "open-loop" or "open-loop control" generally refer to a control loop or control command that does not receive feedback from a measured output variable of a system subject to such control loop or control command.

As used herein, the terms "closed-loop" or "closed-loop control" generally refer to a control loop or control command that utilizes as an input or depends on feedback from, a measured output variable of a system subject to such control loop or control command. Such a measured output variable may include a measurement from a sensor configured to measure a system variable that depends on an input by such control loop or control command. A controller 200 that utilizes closed-loop control may compare a measured output variable to a setpoint to determine an error value, which may be used, for example, in a PID control model or any other desired control model.

An exemplary distributed control module 104 may include a communication interface 204 configured to communicatively couple the distributed control module 104 and the main processing unit 102 via wired or wireless communication lines 205. The communication lines 205 may include a data bus or a combination of wired and/or wireless communication links. The communication interface 204 may include any suitable components for interfacing with one or more network(s), including for example, data busses, transmitters, receivers, ports, controllers, antennas, and/or other suitable components. An exemplary distributed control module 104 may additionally include a power supply interface 206 operably coupled to a power supply unit 208, and a sensor interface 210 operably coupled to one or more sensors 212.

Figure 3:
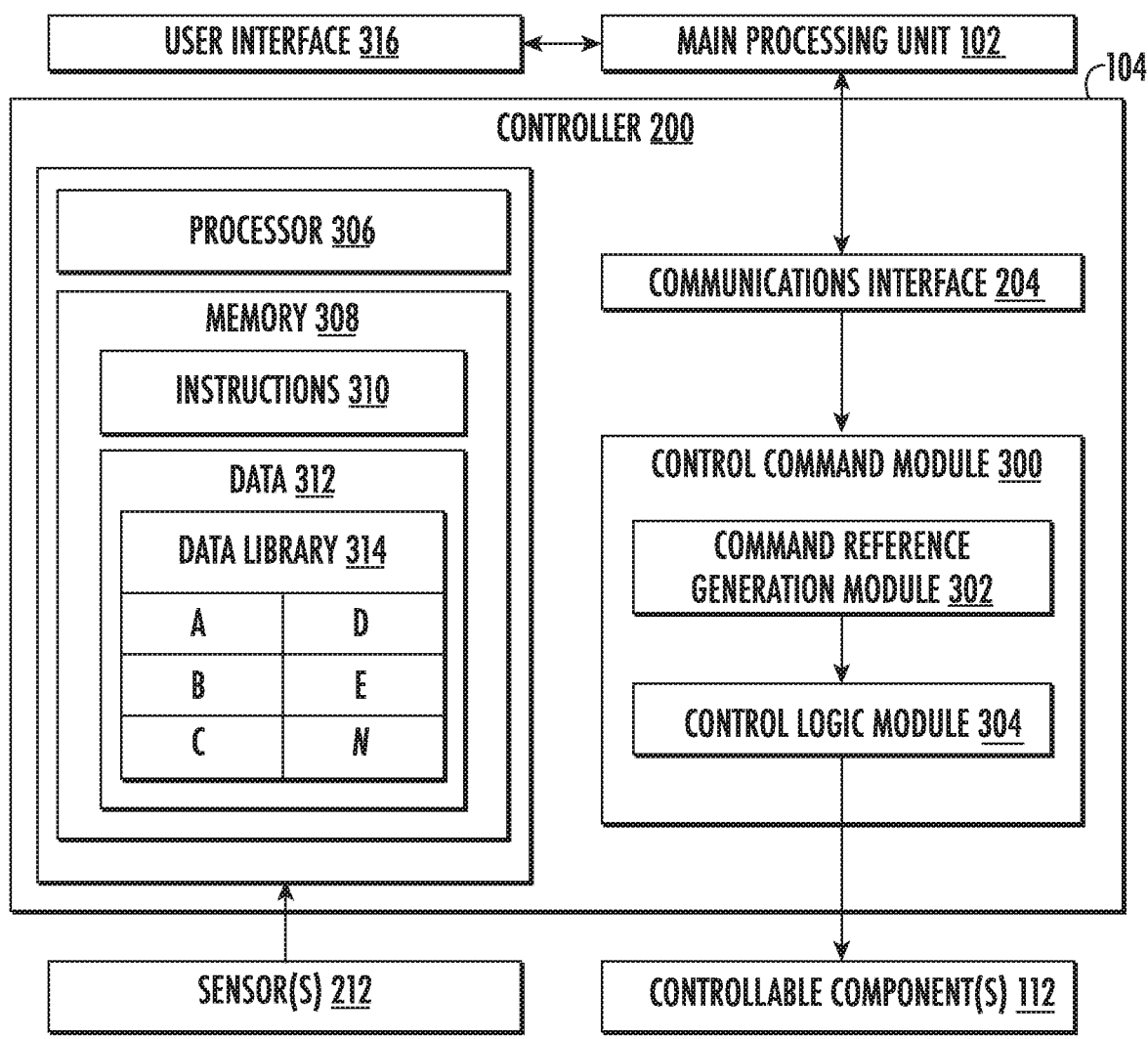
FIG. 3 shows a block diagram depicting an exemplary controller of a distributed control module.

Now turning to FIG. 3, an exemplary controller 200 of a distributed control module 104 will be described. As shown, an exemplary controller 200 may include a control command module 300, a command reference generation module 302, and a control logic module 304. The command reference generation module 302 and/or the control logic module 304 may be included as part of the control command module or as separate modules of the controller 200.

The control command module 300 may also include one or more control modes, including one or more closed loop control modes, one or more open loop control modes, and/or a disconnect control mode. The control command module 300 may be configured to output control commands to one or more controllable components. The control commands may be based at least in part on a series of cumulating command references as described herein.

The command reference generation module 302 may be configured to generate and/or select a command reference for use in control logic of a control loop handled by the controller 200 or the distributed control module 104. The command reference generation module 302 may generate a series of cumulating command references as described herein. Additionally, or in the alternative, the command reference generation module 302 may be configured to select from among a number of possible command references for use in the control loop, or to cause another module associated with the controller 200 to utilize one of a number of possible command references in the control loop.

The control logic module 304 may be configured to process control logic associated with one or more control loops handled by the controller 200 or the distributed control module 104, including control logic for one or more closed-loop and/or open-loop control regimes. The control logic may include machine-executable instructions that can be executed by one or more processors associated with the controller 200 or the distributed control module 104.

The controller 200 may include one or more computing devices, including one or more processors 306 and one or more memory devices 308, and such computing devices are preferably located locally to the distributed control module 104. The one or more processors 306 may include any suitable processing device, such as a microprocessor, microcontroller, integrated circuit, logic device, and/or other suitable processing device. The one or more memory devices 308 may include one or more computer-readable media, including but not limited to non-transitory computer-readable media, RAM, ROM, hard drives, flash drives, and/or other memory devices 308.

The one or more memory devices 308 may store information accessible by the one or more processors 306, including machine-executable instructions 310 that can be executed by the one or more processors 306. The instructions 310 may include any set of instructions 310 which when executed by the one or more processors 306 cause the one or more processors 306 to perform operations. In some embodiments, the instructions 310 may be configured to cause the one or more processors 306 to perform operations, including operations for which the controller 200, the distributed control module 104, and/or the one or more computing devices are configured. More particularly, such operations may include operations of the command reference generation module 302, operations of the control logic module 304, and/or operations of the control command module 300. Operations of the command reference generation module 302 may include generating a series of cumulating command references as described herein.

Processor 306 operations may additionally include controlling the one or more controllable components 112 according to a control loop, for example, using a series of cumulating command references 406. Such operations may additionally or alternatively include receiving inputs from the one or more sensors 212 and controlling the one or more controllable components 112 responsive to the one or more sensors 212 according to a control loop. Such operations may additionally or alternatively be carried out according to supervisory control provided by the main processing unit 102. The machine-executable instructions 310 can be software written in any suitable programming language or can be implemented in hardware. Additionally, and/or alternatively, the instructions 310 can be executed in logically and/or virtually separate threads on processors 306.

The memory devices 308 may store data 312 accessible by the one or more processors 306. The data 312 can include current or real-time data, past data, or a combination thereof. The data 312 may be stored in a data library 314. As examples, the data 312 may include data 312 associated with or generated by the main processing unit 102, the one or more sensors 212, and/or the distributed control module 104, including data 312 associated with or generated by a controller 200 or a processor 306. The data 312 may also include other data sets, parameters, outputs, information, associated with the distributed control module 104 or the distributed control system 100.

The communication interface 204 may additionally or alternatively allow the distributed control module 104 and/or the main processing unit 102 to communicate with a user interface 316.

Figure 4A:
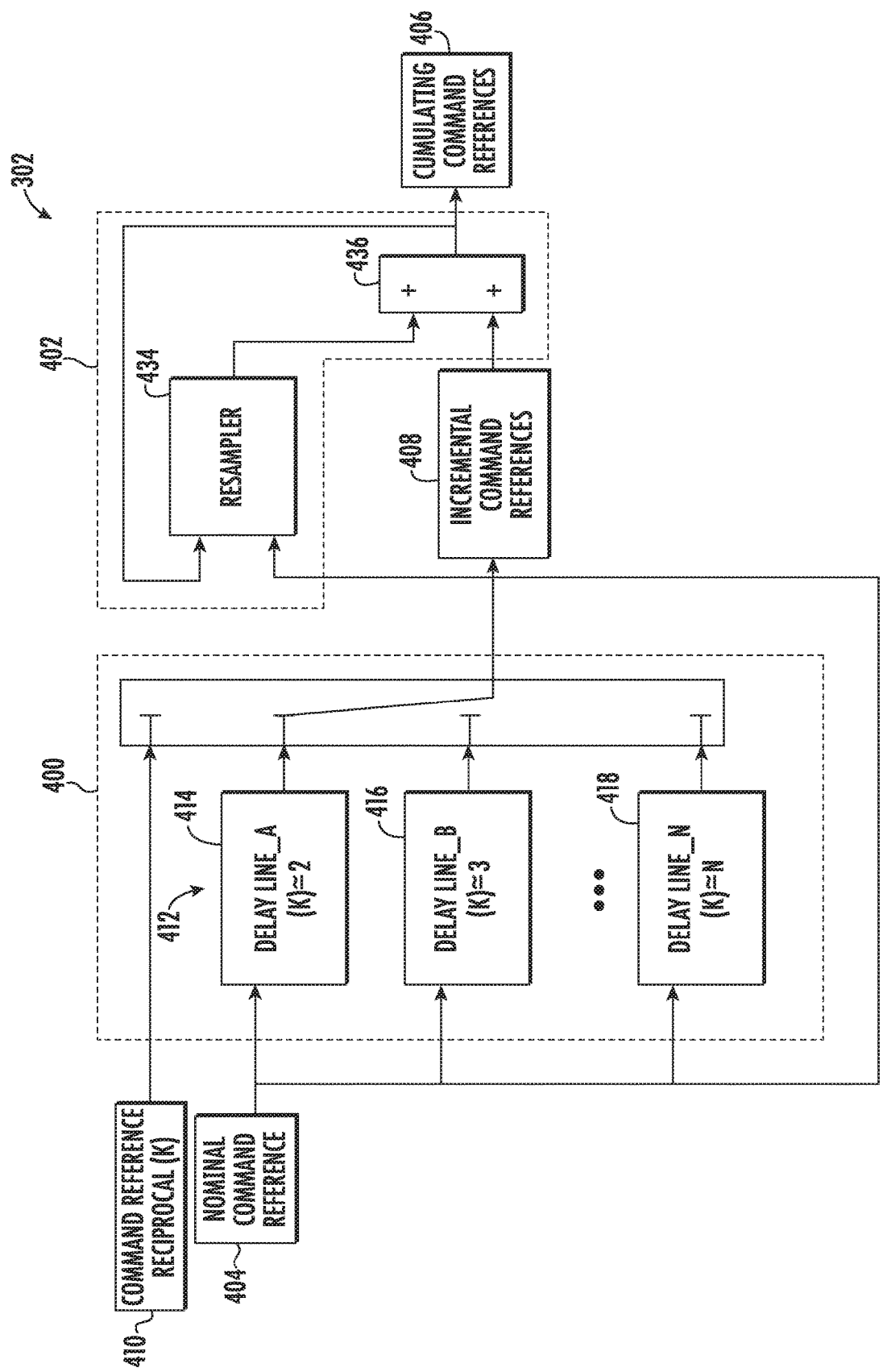
FIGS. 4A and 4B show block diagrams depicting exemplary aspects of a control command module of a distrusted control module, including aspects of a command reference generation module.

Now referring to FIGS. 4A and 4B, and exemplary command reference generation module 302 will be described. As shown in FIG. 4A, an exemplary command reference generation module 302 may include a delay line module 400 and an accumulator module 402. The command reference generation module 302 may be configured to receive a nominal command reference 404 and to determine a series of cumulating command references 406 based at least in part on the nominal command reference 404. The series of cumulating command references 406 may be determined at least in part using the delay line module 400 and/or the accumulator module 402.

The main processing unit 102 may operate according to an MPU unit time interval (u), with (u) representing a unit of time of an MPU clock. The distributed control module 104 may operate according to a DCM unit time interval (t), with (t) representing a unit of time of a DMC clock. The command reference generation module 302 may automatically generate cumulating command references 406 regardless of whether the DCM unit time interval (t) and the MPU unit time interval (u) may have synchronous or asynchronous time domains. The MPU unit time interval (u) may exceed the DCM unit time interval (t). Generally, the command reference generation module 302 may be configured to augment the nominal command reference 404 from the main processing unit 102 based at least in part on a difference between the unit of time of the DMC clock (t), and the unit of time of the MPU clock, (u). For example, in exemplary embodiments the unit of time of the DMC clock (t) may have a shorter duration than the unit of time of the MPU clock (u), such that the distributed control module 104 may be capable of operating faster than the main processing unit 102. In one scenario, a distributed control module may be capable of determining and/or outputting command references and/or control commands to a controllable component 112 at a rate that exceeds the rate at which nominal command references 404 are provided by the main processing unit 102. In this scenario, the command reference generation module 302 may be configured to upsample, expand, or interpolate the nominal command reference 404 so as to provide more frequent command references and/or more frequent control commands, such as the cumulating command references 406 and/or the cumulating control commands described herein.

Figure 4B:
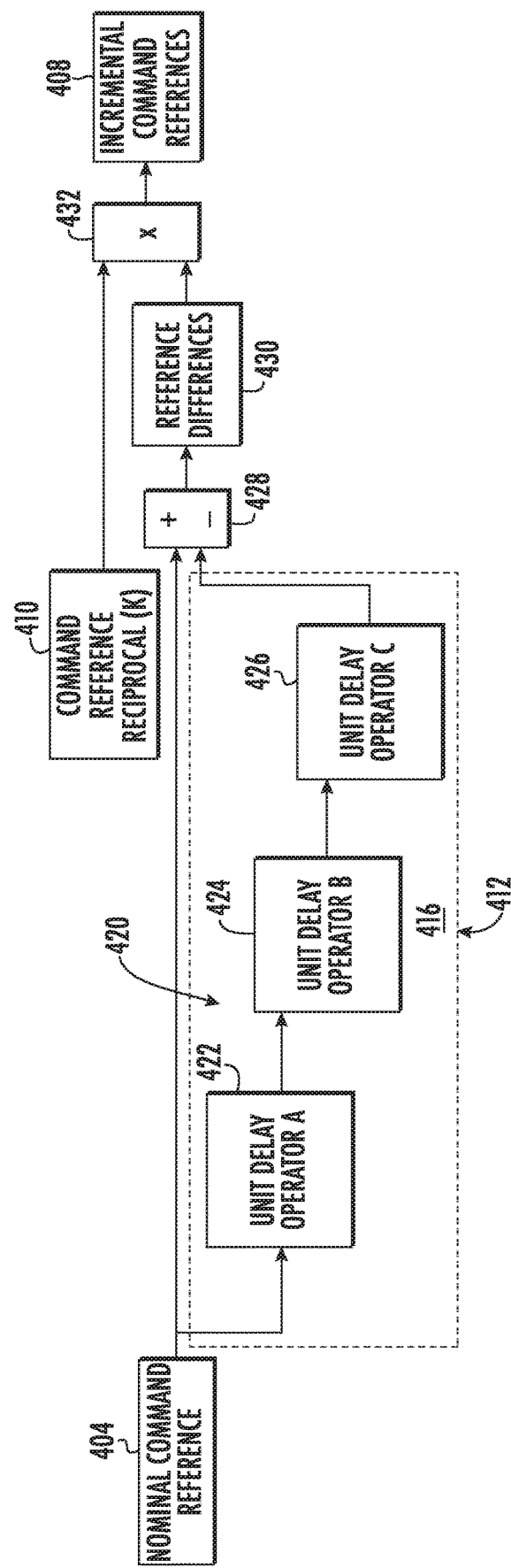

As shown in FIGS. 4A and 4B, the command reference generation module 302 may include a delay line module 400 configured to provide incremental command references 408, and an accumulator module 402 configured to provide cumulating command references. The incremental command references 408 may be incremented by a command reference reciprocal (K) 410, in which (K) represents a real number. In exemplary embodiments, a command reference reciprocal (K) 410 may be an integer; however, in other embodiments a command reference reciprocal (K) 410 may also be a non-integer factor. The command reference reciprocal (K) 410 may be input or selected by a user, such as via a user interface 204. Additionally, or in the alternative, the command reference reciprocal (K) 410 may be determined or selected by a distributed control module 104 without requiring a user input. The nominal command reference 404 may include an MPU command reference from a main processing unit divided by the command reference reciprocal (K) 410.

In exemplary embodiments, the command reference reciprocal (K) 410 may be input, determined, or selected such that a product of a DCM unit time interval (t) and the command reference reciprocal (K) 410 may be proportional to an MPU unit time interval (u) to within one unit of the DCM unit time interval (t). In some embodiments, the DCM unit time interval (t) and the MPU unit time interval (u) may have synchronous time domains, for example, such that (K)-increments of the DCM unit time interval (t) equals one increment of the MPU unit time interval (u). Alternatively, in other embodiments the DCM unit time interval (t) and the MPU unit time interval (u) may have asynchronous time domains. However, regardless of whether such time domains are synchronous or asynchronous, in exemplary embodiments, the command reference reciprocal (K) 410 may be input, determined, or selected such that a product of the DCM unit time interval (t) and the command reference reciprocal (K) 410 is proportional to the MPU unit time interval (u) to within one unit of the DCM unit time interval (t).

In some embodiments, a command reference reciprocal (K) 410 may be input, determined, or selected such that (K)-increments of the DCM unit time interval (t) may fall within one increment of the MPU unit time interval (u) by less than one increment of the DCM unit time interval (t). For example, a command reference reciprocal (K) 410 may be input, determined, or selected such that (K)-increments of the DCM unit time interval (t) exceeds one increment of the MPU unit time interval (u) by less than one increment of the DCM unit time interval (t), or such that one increment of the MPU unit time interval (u) exceeds (K)-increments of the DCM unit time interval (t) by less than one increment of the DCM unit time interval (t). Alternatively, in some embodiments the command reference reciprocal (K) 410 may be input, determined, or selected such that (K)-increments of the DCM unit time interval (t) equals one increment of the MPU unit time interval (u).

The delay line module 400 may include one or more delay lines 412, and a delay line 412 may be selected or configured based at least in part on the command reference reciprocal (K) 410. For example, as discussed with reference to FIG. 4B, a delay line 412 may include a series of (K)-unit delay operators 420. A delay line 412 having a desired number of unit delay operators 420 may be determined, selected, generated, or configured by a distributed control module 104 and/or input or selected by a user. For example, as shown in FIG. 4A, a delay line module 400 may include a plurality of delay lines 412 from which a distributed control module 104 and/or a user may select, such as a first delay line 414, a second delay line 416, and an Nth delay line 418.

The distributed control module 104 and/or the delay line module 400 may determine or select a delay line 412 from among a plurality of delay lines 412, for example, based at least in part on a command reference reciprocal (K) 410. For example, a delay line 412 may be determined or selected that includes a series of (K)-unit delay operators 420. By way of example, the first delay line 414 may include two delay lines 412. The first delay line 414 may be determined or selected when the command reference reciprocal (K) 410 is 2. The second delay line 416 may include three delay lines 412. The second delay line 416 may be determined or selected when the command reference reciprocal (K) 410 is 3. The Nth delay line 418 may include N delay lines 412, and the Nth delay line 418 may be determined or selected when the command reference reciprocal (K) 410 is N.

In some embodiments, when the command reference reciprocal (K) 410 is a non-integer, the delay line 412 that has a number of unit delay operators 420 that most closely approximates the non-integer value of the command reference reciprocal (K) 410 may be determined or selected. For example, the first delay line 414 having two delay lines 412 may be selected when the command reference reciprocal (K) 410 is a non-integer of between 1.1 and 2.5. As another example, the second delay line 416 having three delay lines 412 may be selected when the command reference reciprocal (K) 410 is a non-integer of between 2.5 and 3.5. Further, the third delay line 418 having N delay lines 412 may be selected when the command reference reciprocal (K) 410 is a non-integer of between (N−0.5) and (N+0.5).

Alternatively, a distributed control module 104 and/or the delay line module 400 may generate or configure a delay line 412 so as to provide a series of (K)-unit delay operators 420. For example, a distributed control module 104 may determine an MPU unit time interval (u) and a DCM unit time interval (t), and then the distributed control module 104 may determine a command reference reciprocal (K). The distributed control module 104 may then generate or configure a delay line 412 having a series of (K)-unit delay operators 420.

Now turning to FIG. 4B, an exemplary delay line module 400 and exemplary operations thereof will be further described. An exemplary delay line 412 may include (K)-unit delay operators 420. By way of example, the command reference reciprocal (K) 410 may be three (3), and as shown, a corresponding delay line 412 may include three (3) unit delay operators 420. Each of the unit delay operators 420 may be configured to delay the nominal command reference 404 input thereto by one DCM unit time interval (t), such as by perform a z-transform. The delay line module 400 may determine a series of K(t)-incremental command references 408 sequentially corresponding to one of (K)-increments of the DCM unit time interval (t), in which K(t) represents (K) increments as a function of (t). The series of K(t)-incremental command references 408 may be determined by the delay line module 400 at least in part using the delay line 412 and the command reference reciprocal (K) 410.

The delay line 412 may be configured to delay the nominal command reference 404 using the series of (K)-unit delay operators 420 so as to provide a series of K(t)-delayed nominal command references 404. The K(t)-delayed nominal command reference 404 may be sequentially delayed by one of the (K)-increments of the DCM unit time interval (t). For example, a first unit delay operator 422 may receive the nominal command reference 404 at an initial DCM unit time (t+0) and delay the nominal command reference 404 by a first increment of the DCM unit time interval (t). The first unit delay operator 422 may provide the nominal command reference 404, as delayed (t+1), to a second unit delay operator 424 at the first increment of the DCM unit time interval (t). The second unit delay operator 424, having received the nominal command reference 404, as delayed (t+1), may further delay the nominal command reference 404 by a second increment of the DCM unit time interval (t+2). The second unit delay operator 424 may provide the nominal command reference 404, as delayed (t+2), to a third unit delay operator 426 at the second increment of the DCM unit time interval (t+2). The third unit delay operator 426, having received the nominal command reference 404, as delayed (t+2), may further delay the nominal command reference 404 by a third increment of the DCM unit time interval (t+3). The third unit delay operator 426 may provide the nominal command reference 404, as delayed (t+3), to a subtraction operator 428 at the third increment of the DCM unit time interval (t+3).

Meanwhile, the first unit delay operator 422 may sequentially receive subsequent nominal command references 404 at sequentially subsequent increments of the DCM unit time interval (t), with such sequentially subsequent nominal command references 404 passing through the series of unit delay operators 420 at sequential DCM unit time intervals (t) to the subtraction operator 428. The nominal command reference 404 may be updated by the main processing unit 102 at MPU unit time intervals (u).

The subtraction operator 428 may be configured to sequentially subtract respective ones of the series of K(t)-delayed nominal command references 404 from the nominal command reference 404 corresponding to respective ones of the (K)-increments of the DCM unit time interval (t), providing a series of K(t)-reference differences 430 sequentially corresponding to one of the (K)-increments of the DCM unit time interval (t). For example, at an initial DCM unit time (t+0), the subtraction operator 428 may subtract an initial condition from the nominal command reference 404. At the initial DCM unit time (t+0), the series of (K)-unit delay operators 420 would have not yet provided the nominal command reference 404 to the subtraction operator 428, because the series of (K)-unit delay operators 420 would delay the nominal command reference 404 by the (K)-increments of the DCM unit time interval (t).

To illustrate, if a nominal command reference 404 has a value of 5 and an initial condition has a value of zero (0), the subtraction operator 428 may subtract zero (0) from 5 at an initial DCM unit time (t+0). At (K)-increments of the DCM unit time interval (t+K), the series of (K)-unit delay operators 420 may provide the nominal command reference 404, as delayed (t+K), to the subtraction operator 428, and the subtraction operator 428 may subtract the nominal command reference 404 at (t+K) from the nominal command reference 404 as delayed (t+K). For example, if the nominal command reference 404 still has a value of 5 at a DCM unit time (t+K), the subtraction operator 428 may subtract 5 from 5 at the DCM unit time (t+K). As another example, if the nominal command reference 404 has a value of 10 at a DCM unit time (t+K), the subtraction operator 428 may subtract 5 from 10 at the DCM unit time (t+K).

Still referring to FIG. 4B, the subtraction operator 428 may provide a series of K(t)-reference differences 430. A multiplier 432 may be configured to sequentially multiply respective ones of the series of K(t)-reference differences 430 by the command reference reciprocal (K) 410 corresponding to respective ones of the (K)-increments of the DCM unit time interval (t). Such sequential multiplying by the multiplier 432 may provide a series of K(t)-incremental command references 408 sequentially corresponding to one of the (K)-increments of the DCM unit time interval (t).

Referring again to FIG. 4A, the accumulator module 402 may receive the series of K(t)-incremental command references 408 and determine a series of K(t)-cumulating command references 406 sequentially corresponding to one of the (K)-increments of the DCM unit time interval (t). The series of K(t)-cumulating command reference 406 may be determined based at least in part on the series of K(t)-incremental command references 408. The accumulator module 402 may be configured to accumulate the series of K(t)-incremental command references 408 sequentially corresponding to one of the (K)-increments of the DCM unit time interval (t). For example, the accumulator module 402 may add or sum (a) a K(t+0)-incremental command reference 408 corresponding to a K(t+0)-DCM unit time interval (t+0) and (b) a K(t−1)-incremental command reference 408 corresponding to a K(t−1)-DCM unit time interval (t).

In an exemplary embodiment, as shown in FIG. 4A, an accumulator module 402 may include a resampler 434 and an addition operator 436. The resampler 434 may be configured to sequentially resample the series of K(t)-cumulating command references 406 and sequentially delay the K(t)-cumulating command references 406 by an increment of the DCM unit time interval (t). For example, the resampler 434 may be configured to resample the K(t+0)-cumulating command reference 406 corresponding to the K(t+0)-DCM unit time interval (t+0), and to delay the K(t+0)-cumulating command reference 406 by the DCM unit time interval (t). The resampler 434 may provide to the addition operator 436, the (t+0)-cumulating command reference 406, as delayed (t+1). Meanwhile the delay line module 400 may provide to the addition operator 436, a K(t+1)-incremental command reference 408 corresponding to a K(t+1)-DCM unit time interval (t). The addition operator 436 may add or sum (a) the K(t+1)-incremental command reference 408 corresponding to the K(t+1)-DCM unit time interval (t) and (b) the K(t+0)-cumulating command reference after having been delayed, at the resampler 434, by the DCM unit time interval (t).

Figure 5A:
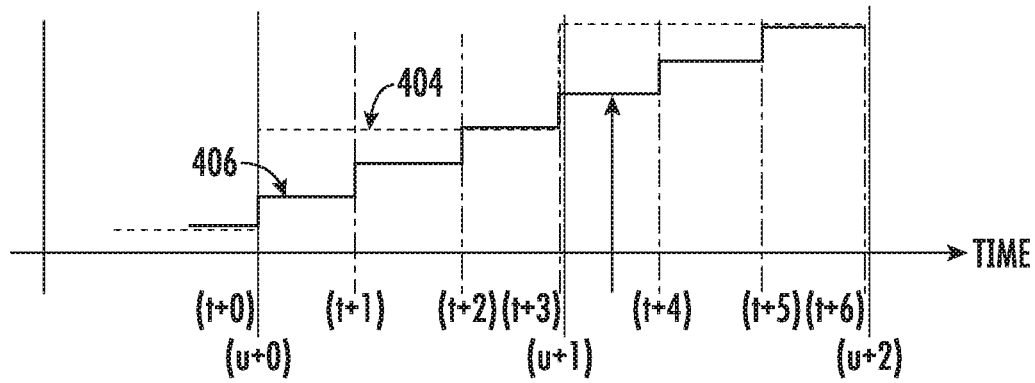
FIGS. 5A-5C graphically show exemplary nominal command references input to a command reference generation module and corresponding cumulating command references output by the command reference generation module.
Figure 5B:
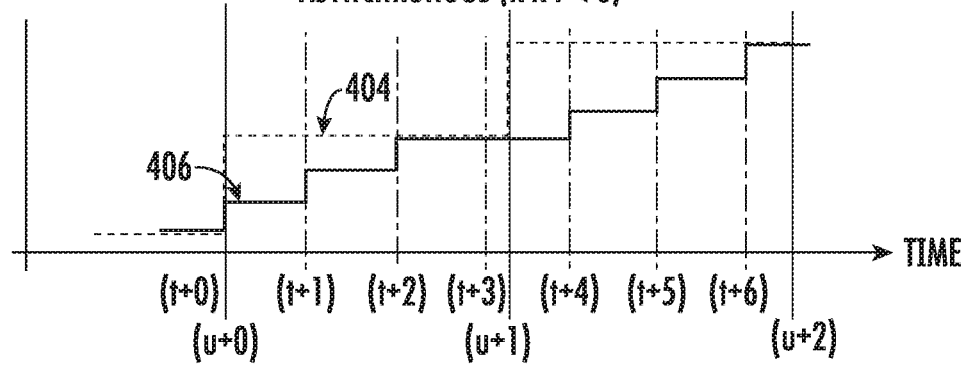
Figure 5C:
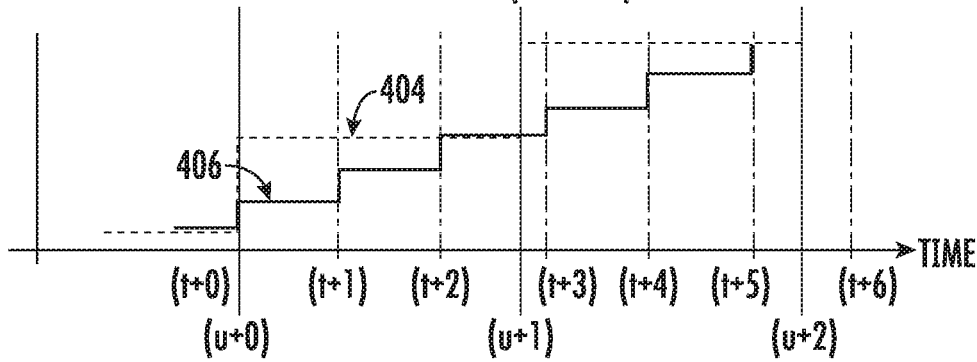

Now referring to FIGS. 5A-5C, graphically depicted are exemplary nominal command references 404 input to a command reference generation module 302 and corresponding cumulating command references 406 output by the command reference generation module 302. FIG. 5A corresponds to a distributed control module 104 that has a DCM clock providing a DCM unit time interval (t) that is synchronous with an MPU clock providing an MPU unit time interval (u), such that the DCM unit time interval (t) and the MPU unit time interval (u) may have synchronous time domains. As shown, the MPU unit time interval (u) is three times longer than the DCM unit time interval (t). In the example depicted in FIG. 5A, the command reference reciprocal (K) 410 has been accordingly set to 3. As a result, the command reference generation module 302 provides a series of K(t)-cumulating command references 406 that cumulate over three intervals of the DCM unit time interval (t), matching the nominal command reference 404 at intervals of the MPU unit time interval (u).

FIGS. 5B and 5C correspond to a distributed control module 104 that has a DCM clock providing a DCM unit time interval (t) that is asynchronous with an MPU clock providing an MPU unit time interval (u), such that the DCM unit time interval (t) and the MPU unit time interval (u) may have asynchronous time domains. In the scenarios depicted in FIGS. 5B and 5C, the MPU unit time interval (u) is approximately three times longer than the DCM unit time interval (t), and the command reference reciprocal (K) 410 has been set to 3. As shown in FIG. 5B, the MPU unit time interval (u) is slightly greater than three times the DCM unit time interval (t). As shown in FIG. 5C, the MPU unit time interval (u) is slightly less than three times the DCM unit time interval (t). In both of these scenarios, the next K(t)-cumulating command reference 406 following an interval of the MPU unit time interval (u) may be delayed by a fraction of the DCM unit time interval (t). Such delay may be accepted and still realize advantages of the present disclosure, for example, because the delay is less than an interval of the MPU unit time interval (u). Alternatively, the command reference reciprocal (K) 410 may be set to a non-integer value, which may eliminate such asynchronous time domain.

Figure 6:
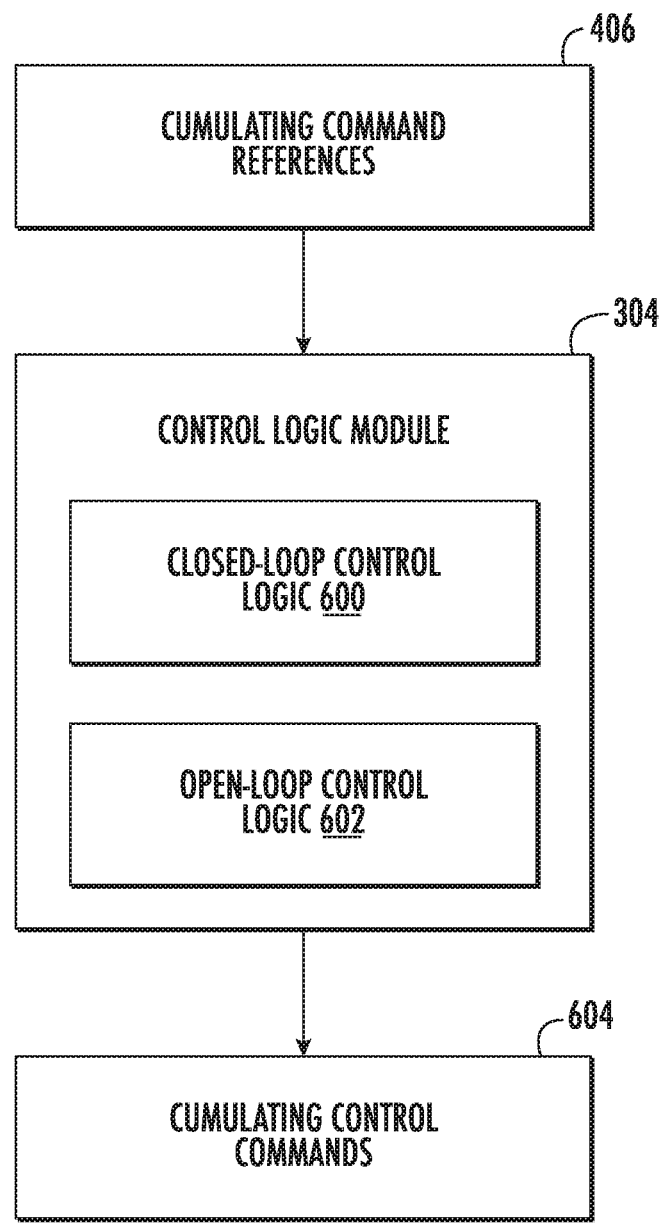
FIG. 6 shows a block diagram depicting exemplary aspects of a control command module of a distrusted control module, including aspects of a control logic module.

Now referring to FIG. 6, an exemplary control logic module 304 will be described. As shown in FIG. 6, an exemplary control logic module 304 may include a plurality of control regimes which may be selected. By way of example, a control logic module 304 may include one or more variations of closed-loop control logic 600 and/or one or more variations of open-loop control logic 602. The control logic module 304 may select from among one or more variations of closed-loop or open-loop control logic 600, 602, based on any desired criterion. For example, control logic 600, 602 may be selected based on an input from the main processing unit 102 and/or based at least in part on an input from one or more sensors 212. The control logic module 304 may be configured to receive a series of cumulating command references 406, such as from the command reference generation module 302. Using selected control logic 600, 602, the control logic module 304 may be configured to determine a series of cumulating control commands 604. The series of cumulating control commands 604 may be determined based at least in part on the series of cumulating command references 406. The control logic module 304 and/or the control command module 300 may further be configured to output the series of cumulating control commands 604 to a controllable component 112.

Figure 7A:
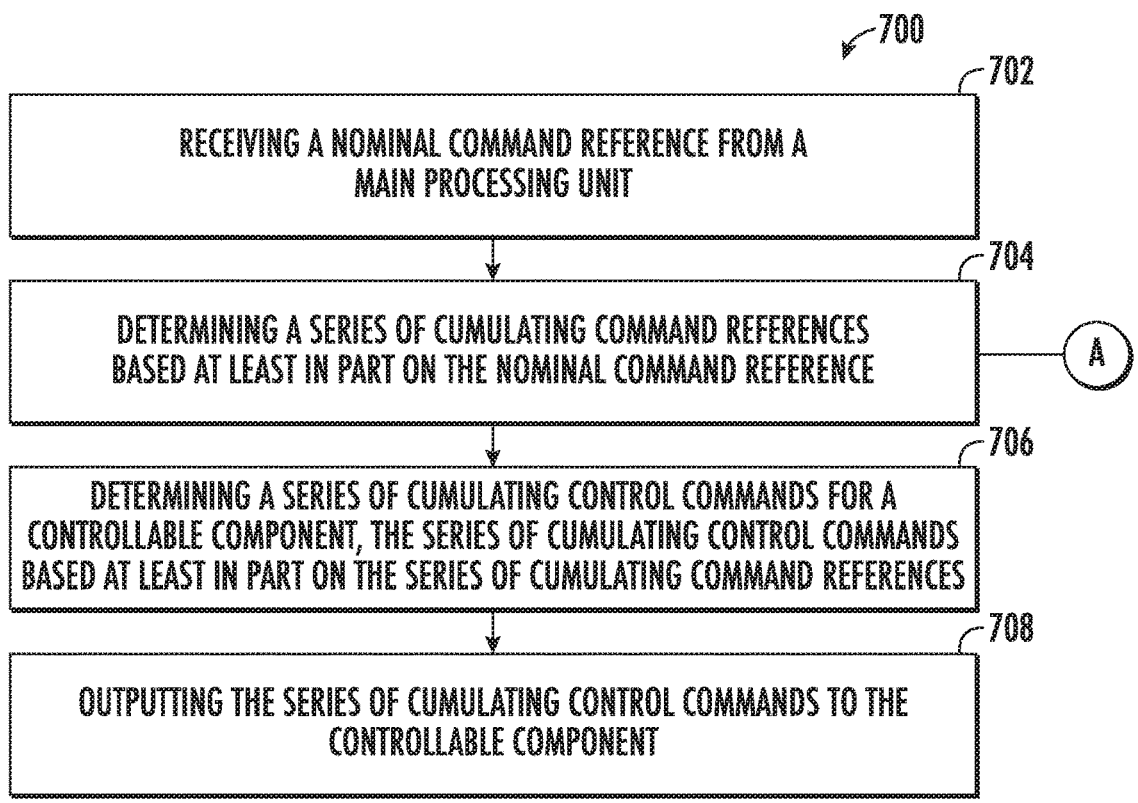
FIGS. 7A-7E shows block diagrams depicting aspects of exemplary methods of controlling a controllable component.

Now turning to FIGS. 7A-7E, exemplary methods 700 of controlling a controllable component 112 will be discussed. As shown in FIG. 7A, an exemplary method 700 may include, at block 702, receiving a nominal command reference 404 from a main processing unit 102; at block 704, determining a series of cumulating command references 406 based at least in part on the nominal command reference 404; and at block 706, determining a series of cumulating control commands 604 for a controllable component 112. The series of cumulating control commands 604 may be based at least in part on the series of cumulating command references 406. An exemplary method 700 may additionally include, at block 708, outputting the series of cumulating control commands 604 to a controllable component 112.

Figure 7B:
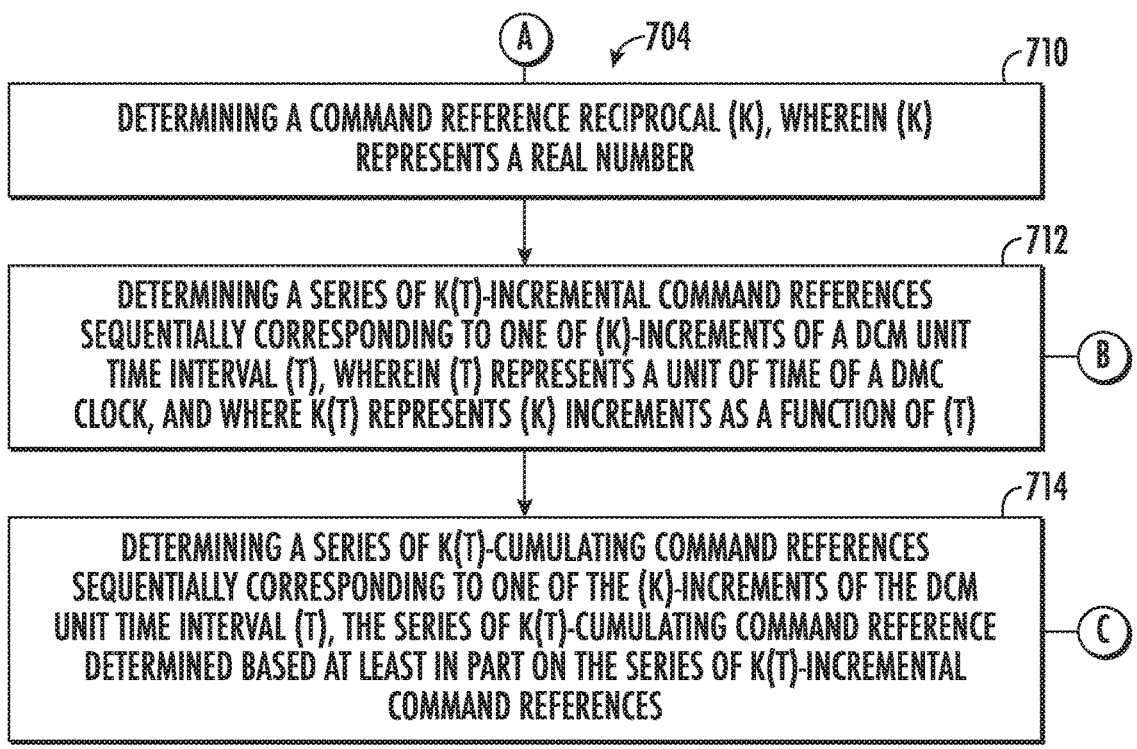

FIG. 7B shows exemplary aspects of determining a series of cumulating command references 406 based at least in part on the nominal command reference 404, at block 704. As shown, in an exemplary method 700, block 704 may include, at block 710, determining a command reference reciprocal (K) 410. In exemplary embodiments, (K) may represent a real number, including an integer or a non-integer value. An exemplary method 700 may additionally include, at block 712, determining a series of K(t)-incremental command references 408 sequentially corresponding to one of (K)-increments of a DCM unit time interval (t), in which (t) represents a unit of time of a DMC clock, and K(t) represents (K) increments as a function of (t). Further, an exemplary method may include, at block 714, determining a series of K(t)-cumulating command references 406 sequentially corresponding to one of the (K)-increments of the DCM unit time interval (t). The series of K(t)-cumulating command reference 406 may be determined based at least in part on the series of K(t)-incremental command references 408.

Figure 7C:
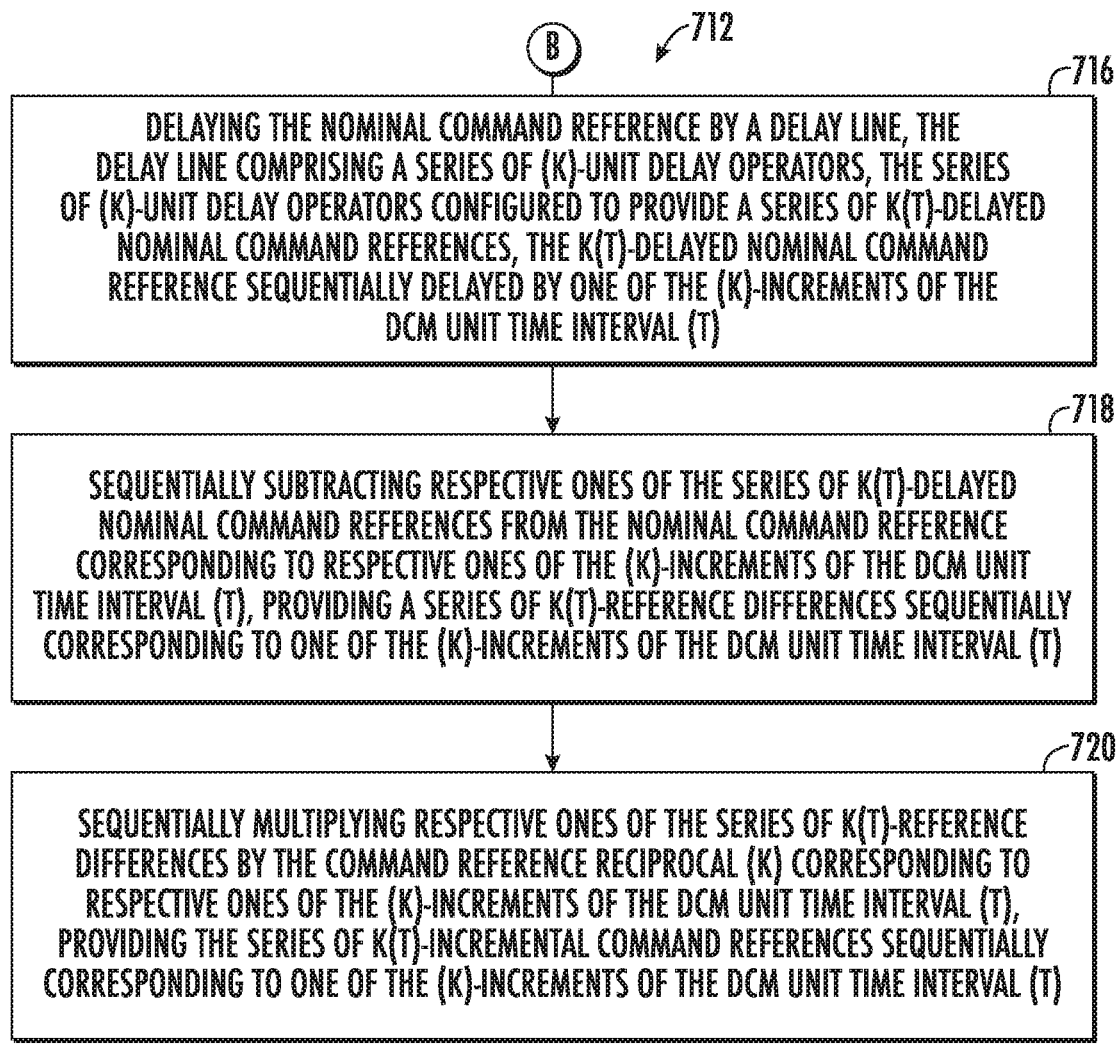

FIG. 7C shows exemplary aspects of determining a series of K(t)-incremental command references 408 sequentially corresponding to one of (K)-increments of a DCM unit time interval (t), at block 712. As shown, in an exemplary method 700, block 712 may include, at block 716, delaying the nominal command reference 404 by a delay line 412. The delay line 412 may include a series of (K)-unit delay operators 420. The series of (K)-unit delay operators 420 may be configured to provide a series of K(t)-delayed nominal command references 404, with the K(t)-delayed nominal command reference 404 sequentially delayed by one of the (K)-increments of the DCM unit time interval (t). An exemplary method 700 may additionally include, at block 718, sequentially subtracting respective ones of the series of K(t)-delayed nominal command references 404 from the nominal command reference 404 corresponding to respective ones of the (K)-increments of the DCM unit time interval (t), providing a series of K(t)-reference differences 430 sequentially corresponding to one of the (K)-increments of the DCM unit time interval (t). At block 720, an exemplary method 700 may include sequentially multiplying respective ones of the series of K(t)-reference differences 430 by the command reference reciprocal (K) 410 corresponding to respective ones of the (K)-increments of the DCM unit time interval (t), providing the series of K(t)-incremental command references 408 sequentially corresponding to one of the (K)-increments of the DCM unit time interval (t).

Figure 7D:
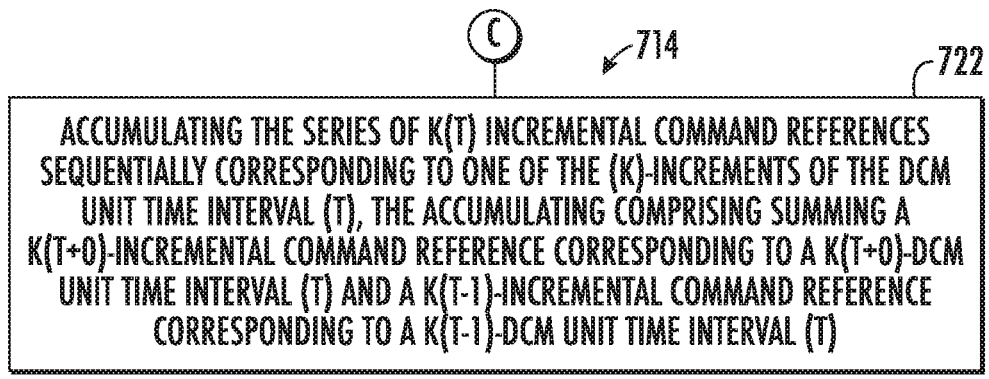

FIG. 7D shows an exemplary embodiment of determining a series of K(t)-cumulating command references 406 sequentially corresponding to one of the (K)-increments of the DCM unit time interval (t), at block 714. As shown, in an exemplary method 700, block 714 may include, at block 722, accumulating the series of K(t)-incremental command references 408 sequentially corresponding to one of the (K)-increments of the DCM unit time interval (t). The accumulating may include summing a K(t+0)-incremental command reference 408 corresponding to a K(t+0)-DCM unit time interval (t+0) and a K(t−1)-incremental command reference 408 corresponding to a K(t−1)-DCM unit time interval (t).

Figure 7E:
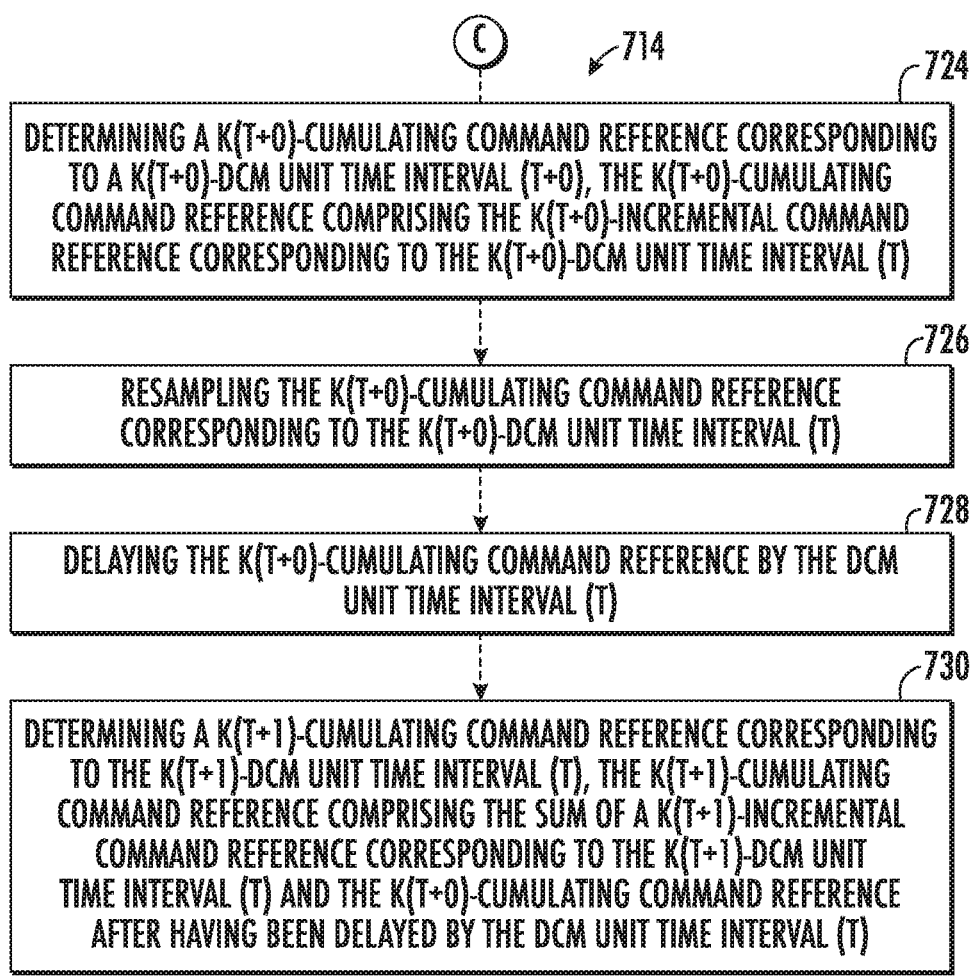

FIG. 7E shows another exemplary embodiment of determining a series of K(t)-cumulating command references 406 sequentially corresponding to one of the (K)-increments of the DCM unit time interval (t), at block 714. As shown in FIG. 7E, and exemplary method 700 may include, at block 724, determining a K(t+0)-cumulating command reference 406 corresponding to a K(t+0)-DCM unit time interval (t+0). The K(t+0)-cumulating command reference 406 may include the K(t+0)-incremental command reference 408 corresponding to the K(t+0)-DCM unit time interval (t+0). An exemplary method may further include, at block 726, resampling the K(t+0)-cumulating command reference 406 corresponding to the K(t+0)-DCM unit time interval (t+0), and at block 728, delaying the K(t+0)-cumulating command reference 406 by the DCM unit time interval (t). At block 730, an exemplary method 700 may include determining a K(t+1)-cumulating command reference 406 corresponding to a K(t+1)-DCM unit time interval (t). The K(t+1)-cumulating command reference 406 may include the sum of (a) a K(t+1)-incremental command reference 408 corresponding to a K(t+1)-DCM unit time interval (t) and (b) the K(t+0)-cumulating command reference 406 after having been delayed by the DCM unit time interval (t).

It will be appreciated that while the exemplary embodiments are generally depicted as a linear system, it will be appreciated that the scope of the present disclosure also embraces non-linear, higher-order, and otherwise more complex system. For example, it will be appreciated that the z-transforms depicted with respect to the command reference generation module 302 (e.g., the z-transforms for the unit delays in the delay line module 400 and/or for resampling in the accumulator module 402) may be implemented using other methods of Fourier transform, all of which are within the scope of the present disclosure. As another example, it will be appreciated that operations of the command reference generation module 302 may be implemented using other signal processing techniques, including, without limitation, recursive filters such as infinite impulse response filters or finite impulse response filters.

Figure 8:
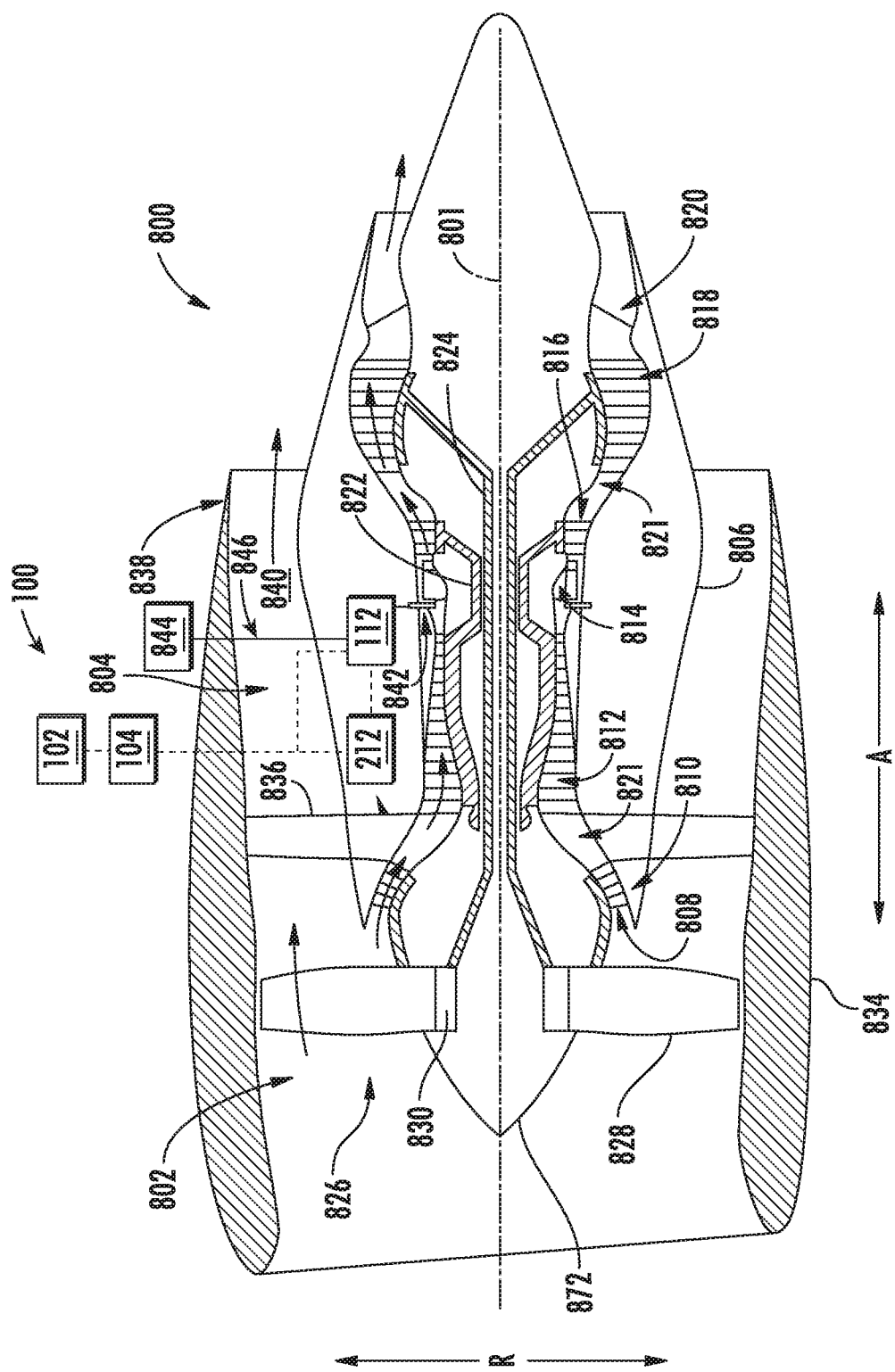
FIG. 8. shows a schematic, cross-sectional view of a turbofan engine that includes a distributed control system with a distributed control module configured according to the present disclosure.

Aspects of the presently disclosure may be incorporated into, or otherwise utilized with, any process, system, or machine where a distributed control system 100 and/or distributed control module 104 may be desirable. By way of example, the present disclosure may be implemented with a turbomachine, such as a turbofan engine 800. FIG. 8 provides a schematic, cross-sectional view of a turbofan engine 800 in accordance with an exemplary embodiment of the present disclosure. The engine 800 may be incorporated into a vehicle, such as an aircraft, a marine vessel, or a land vehicle. For example, the engine 800 may be an aeronautical engine incorporated into an aircraft. Alternatively, however, the engine may be any other suitable type of engine for any other suitable vehicle.

For the embodiment depicted, the engine is configured as a high bypass turbofan engine 800. As shown in FIG. 8, the turbofan engine 800 defines an axial direction A (extending parallel to a longitudinal centerline 801 provided for reference), a radial direction R, and a circumferential direction (extending about the axial direction A; not depicted in FIG. 8). In general, the turbofan 800 includes a fan section 802 and a turbomachine 804 disposed downstream from the fan section 802.

The exemplary turbomachine 804 depicted generally includes a substantially tubular outer casing 806 that defines an annular inlet 808. The outer casing 806 encases, in serial flow relationship, a compressor section including a booster or low pressure (LP) compressor 810 and a high pressure (HP) compressor 812; a combustion section 814; a turbine section including a high pressure (HP) turbine 816 and a low pressure (LP) turbine 818; and a jet exhaust nozzle section 820. The compressor section, combustion section 814, and turbine section together define at least in part a core air flowpath 821 extending from the annular inlet 808 to the jet nozzle exhaust section 820. The turbofan engine further includes one or more drive shafts. More specifically, the turbofan engine includes a high pressure (HP) shaft or spool 822 drivingly connecting the HP turbine 816 to the HP compressor 812, and a low pressure (LP) shaft or spool 824 drivingly connecting the LP turbine 818 to the LP compressor 810.

For the embodiment depicted, the fan section 802 includes a fan 826 having a plurality of fan blades 828 coupled to a disk 830 in a spaced apart manner. The fan blades 828 and disk 830 are together rotatable about the longitudinal axis 801 by the LP shaft 824. The disk 830 is covered by rotatable front hub 832 aerodynamically contoured to promote an airflow through the plurality of fan blades 828. Further, an annular fan casing or outer nacelle 834 is provided, circumferentially surrounding the fan 826 and/or at least a portion of the turbomachine 804. The nacelle 834 is supported relative to the turbomachine 804 by a plurality of circumferentially-spaced outlet guide vanes 836. A downstream section 838 of the nacelle 834 extends over an outer portion of the turbomachine 804 so as to define a bypass airflow passage 840 therebetween.

Referring still to FIG. 8, the turbofan engine 800 additionally includes a fuel delivery system 842. The fuel delivery system 842 generally includes a fuel source 844, such as a fuel tank, and one or more fuel lines 846. The one or more fuel lines 846 provide a fuel flow through the fuel delivery system 842 to the combustion section 814 of the turbomachine 804 of the turbofan engine 800. The fuel delivery system may include one or more controllable components 112, such as a fuel valve or an actuator or servo-actuator coupled to a fuel valve. One or more sensors 212 may be operable coupled, respectively, to the one or more controllable components 112. The one or more controllable components 112 may be controlled using a distributed control module 104, which may be communicatively coupled to a distributed control system 100. The one or more sensors 212 may be communicatively coupled to the distributed control module 104, for example, so as to provide a closed-loop control regime. Alternatively, the distributed control module 104 may provide an open-loop control regime.

It will be appreciated that the exemplary turbofan engine 800 depicted in FIG. 8 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, still, in alternative embodiments, aspects of the present disclosure may be incorporated into, or otherwise utilized with, any other suitable type of gas turbine engine, such as an industrial gas turbine engine incorporated into a power generation system, a nautical gas turbine engine, etc. any other type of engine, such as reciprocating engines.

Further, although not depicted herein, in other embodiments an exemplary engine 800 may include any number of distributed control modules 104 configured to control various controllable components 112 of the engine 800, including variable-geometry components include variable-position fan blades, variable-position guide vanes, variable-position compressor blades, and variable-position turbine blades.

Such distributed control modules 104 may be part of a single distributed control system 100 or part of a plurality of distributed control systems 100.

An exemplary distributed control system 100 may include a main processing unit 102, a distributed control module 104, and a controllable component 112. The distributed control module 104 may be configured according to the present disclosure, for example, to receive a nominal command reference 404, such as from the main processing unit 102; to determine a series of cumulating command references 406, for example, based at least in part on the nominal command reference 404; and to determine a series of cumulating control commands 604 based at least in part on the series of cumulating command references 406. The distributed control module 104 may additionally be configured to output the series of cumulating control commands 604 to a controllable component 112.

In some embodiments, an exemplary distributed control system 100 may additionally include a sensor 212 configured to measure a system variable of the controllable component 112. For example, the sensor 212 may include a position sensor configured to measure a position of an actuator or servo-actuator. The distributed control module 104 may be configured to receive sensor feedback from the sensor 212, and to use the sensor feedback in a closed-loop control regime that includes the series of cumulating control commands 604. Additionally, or in the alternative, the distributed control module 104 may be configured to provide an open-loop control regime.

The distributed control system 100 may include any suitable controllable components 112. An exemplary controllable component 112 may include an actuator or a servo-actuator, which may be coupled to a variable-geometry component. By way of example, a variable-geometry component may include a fuel valve, a variable-position fan blade, a variable-position guide vane, a variable-position compressor blade, or a variable-position turbine blade.

Aspects of the present disclosure may also be implemented in computer readable medium. Exemplary computer readable medium may include computer-executable instructions 310 configured according to the present disclosure. For example, computer-executable instructions 310, when executed by one or more processors 306 of a distributed control module 104, may cause the distributed control module 104 to: receive a nominal command reference 404 from a main processing unit 102; determine a series of cumulating command references 406 based at least in part on the nominal command reference 404; and determine a series of cumulating control commands 604 based at least in part on the series of cumulating command references 406. Exemplary computer-executable instructions 310 may additionally be configured to cause the distributed control module 104 to output the series of cumulating control commands 604 to a controllable component 112. Exemplary computer readable medium may be incorporated into or utilized with a FADEC system or an ECU, such as for a turbomachine or turbofan engine 800 and/or an aircraft.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling a controllable component of a turbomachine, the method comprising:
   receiving a nominal command reference from a main processing unit;
   determining a series of cumulating command references based at least in part on the nominal command reference; and
   wherein determining the series of cumulating command references comprises:
      determining a command reference reciprocal (K), wherein the command reference reciprocal (K) represents a real number;
      determining a series of K(t)-incremental command references sequentially corresponding to one of (K)-increments of a DCM unit time interval (t), wherein the DCM unit time interval (t) represents a unit of time of a DMC clock, and wherein the series of K(t)-incremental command references represents the (K)-increments as a function of the DCM unit time interval (t); and
      determining a series of K(t)-cumulating command references sequentially corresponding to one of the (K)-increments of the DCM unit time interval (t), the series of K(t)-cumulating command reference determined based at least in part on the series of K(t)-incremental command references;
   outputting a series of cumulating control commands to the controllable component of the turbomachine, the series of cumulating control commands based at least in part on the series of cumulating command references, the controllable component including at least one of a variable-geometry component, an actuator operably coupled to the variable-geometry component, and a servo-actuator coupled to the variable-geometry component, wherein outputting the series of cumulating control commands to the controllable component of the turbomachine effects control of the controllable component.

2. The method of claim 1, wherein determining the series of K(t)-incremental command references comprises:
   delaying the nominal command reference by a delay line, the delay line comprising a series of (K)-unit delay operators, the series of (K)-unit delay operators configured to provide a series of K(t)-delayed nominal command references, the K(t)-delayed nominal command reference sequentially delayed by one of the (K)-increments of the DCM unit time interval (t);
   sequentially subtracting respective ones of the series of K(t)-delayed nominal command references from the nominal command reference corresponding to respective ones of the (K)-increments of the DCM unit time interval (t), providing a series of K(t)-reference differences sequentially corresponding to one of the (K)-increments of the DCM unit time interval (t); and
   sequentially multiplying respective ones of the series of K(t)-reference differences by the command reference reciprocal (K) corresponding to respective ones of the (K)-increments of the DCM unit time interval (t), providing the series of K(t)-incremental command references sequentially corresponding to one of the (K)-increments of the DCM unit time interval (t).

3. The method of claim 1, wherein determining the series of K(t)-cumulating command references comprises:
   accumulating the series of K(t)-incremental command references sequentially corresponding to one of the (K)-increments of the DCM unit time interval (t), the accumulating comprising summing a K(t+0)-incremental command reference corresponding to a K(t+0)-DCM unit time interval (t+0) and a K(t−1)-incremental command reference corresponding to a K(t−1)-DCM unit time interval (t).

4. The method of claim 1, wherein determining the series of K(t)-cumulating command references comprises:
   determining a K(t+0)-cumulating command reference corresponding to a K(t+0)-DCM unit time interval (t+0), the K(t+0)-cumulating command reference comprising a K(t+0)-incremental command reference corresponding to a K(t+0)-DCM unit time interval (t+0); and
   determining a K(t+1)-cumulating command reference corresponding to a K(t+1)-DCM unit time interval (t), the K(t+1)-cumulating command reference comprising a sum of a K(t+1)-incremental command reference corresponding to the K(t+1)-DCM unit time interval (t) and the K(t+0)-cumulating command reference after having been delayed by the DCM unit time interval (t).

5. The method of claim 4, comprising:
   resampling the K(t+0)-cumulating command reference corresponding to the K(t+0)-DCM unit time interval (t+0); and
   delaying the K(t+0)-cumulating command reference by the DCM unit time interval (t).

6. The method of claim 1, comprising determining the series of cumulating control commands based at least in part on the series of cumulating command references.

7. The method of claim 1, wherein the nominal command reference comprises an MPU command reference from a main processing unit divided by the command reference reciprocal (K).

8. The method of claim 7, wherein the main processing unit transmits the MPU command reference according to an MPU unit time interval (u), wherein the MPU unit time interval (u) represents a unit of time of an MPU clock, and wherein the MPU unit time interval (u) exceeds the DCM unit time interval (t).

9. The method of claim 8, wherein the DCM unit time interval (t) and the MPU unit time interval (u) may have synchronous or asynchronous time domains.

10. The method of claim 8, comprising:
   determining the command reference reciprocal (K) such that a product of the DCM unit time interval (t) and the command reference reciprocal (K) is proportional to the MPU unit time interval (u) to within one unit of the DCM unit time interval (t).

11. The method of claim 10, wherein:
   the (K)-increments of the DCM unit time interval (t) exceeds one increment of the MPU unit time interval (u) by less than one increment of the DCM unit time interval (t); or
   one increment of the MPU unit time interval (u) exceeds the (K)-increments of the DCM unit time interval (t) by less than one increment of the DCM unit time interval (t).

12. The method of claim 1, comprising:
   receiving sensor feedback from a sensor configured to measure a system variable of the controllable component; and
   using the sensor feedback in a closed-loop control regime comprising the series of cumulating control commands.

13. The method of claim 12, wherein the sensor comprises a position sensor configured to measure a position of the actuator or the servo-actuator.

14. The method of claim 1, wherein the variable-geometry component comprises a fuel valve, a variable-position fan blade, a variable-position guide vane, a variable-position compressor blade, or a variable-position turbine blade.

15. A distributed control system, comprising:
a main processing unit, a distributed control module, and a controllable component of a turbomachine, the distributed control module including at least one of a processor, a memory, and an interface, the controllable component including at least one of a variable-geometry component, an actuator operably coupled to the variable-geometry component, and a servo-actuator coupled to the variable-geometry component, the distributed control module configured to:
receive a nominal command reference from the main processing unit;
determine a series of cumulating command references based at least in part on the nominal command reference;
determine a series of cumulating control commands based at least in part on the series of cumulating command references; and
output the series of cumulating control commands to the controllable component; to effect control of the controllable component.

16. The distributed control system of claim 15, comprising:
a sensor configured to measure a system variable of the controllable component, the sensor comprises a position sensor configured to measure a position of an actuator or servo-actuator;
wherein the distributed control module is configured to:
receive sensor feedback from the sensor; and
use the sensor feedback in a closed-loop control regime comprising the series of cumulating control commands.

17. The distributed control system of claim 16, wherein the controllable component comprises the actuator or the servo-actuator coupled to a variable-geometry component, the variable-geometry component comprising:
a fuel valve, a variable-position fan blade, a variable-position guide vane, a variable-position compressor blade, or a variable-position turbine blade.

18. A non-transitory computer readable medium comprising computer-executable instructions, which, when executed by one or more processors of a distributed control module, cause the distributed control module to:
receive a nominal command reference from a main processing unit;
determine a series of cumulating command references based at least in part on the nominal command reference;
determine a series of cumulating control commands based at least in part on the series of cumulating command references; and
output the series of cumulating control commands to a controllable component of a turbomachine, the controllable component including at least one of a variable-geometry component, an actuator operably coupled to the variable-geometry component, and a servo-actuator coupled to the variable-geometry component, wherein output of the series of cumulating control commands to the controllable component effects control of the controllable component.

19. The non-transitory computer readable medium of claim 18, wherein the non-transitory computer readable medium is incorporated into or utilized with a full authority direct engine control (FADEC) system or an engine control unit (ECU) for a turbomachine and/or an aircraft.

* * * * *